United States Patent [19]

Kobori et al.

[11] 4,268,151
[45] May 19, 1981

[54] VIEWFINDER DIOPTRY ADJUSTING DEVICE FOR SINGLE-LENS REFLEX CAMERAS

[75] Inventors: Toshio Kobori; Takayoshi Miyamoto, both of Sakai, Japan

[73] Assignee: Minolta Camera Kabushiki Kaisha, Osaka, Japan

[21] Appl. No.: 67,967

[22] Filed: Aug. 20, 1979

[30] Foreign Application Priority Data

Aug. 23, 1978 [JP] Japan .......................... 53-116094[U]

[51] Int. Cl.³ ............................................. G03B 13/06
[52] U.S. Cl. ................................................... 354/219
[58] Field of Search .................. 350/47, 255; 354/195, 354/200, 199, 219, 152, 155, 221-225

[56] References Cited

U.S. PATENT DOCUMENTS

| | | | |
|---|---|---|---|
| 2,172,339 | 9/1939 | Mihalyi | 354/222 X |
| 2,529,944 | 11/1950 | Houck | 354/222 |
| 2,755,701 | 7/1956 | Altman | 354/222 |
| 3,845,699 | 11/1974 | Feng | 354/155 |
| 4,164,369 | 8/1979 | Urano et al. | 354/219 |

FOREIGN PATENT DOCUMENTS 2001768 2/1979 United Kingdom ................ 354/222

OTHER PUBLICATIONS

Leica Photography, 1957, No. 2, vol. 10, p. 31, Leica 111G.

*Primary Examiner*—Donald A. Griffin

[57] ABSTRACT

A dioptry adjusting mechanism for an eyepiece of a viewfinder for a single lens reflex camera in which the eyepiece includes a negative lens element movable along the optical axis of the view finder for the dioptry adjustment and a stationary positive lens element located at the eye side of the negative lens element, the mechanism including a lever rotatable in response to a manual operation to displace the negative lens element translationally, with a guide member guiding the lens. A manual member for the adjustment may be disposed somewhat remote from the lenses.

5 Claims, 9 Drawing Figures

VIEWFINDER DIOPTRY ADJUSTING DEVICE FOR SINGLE-LENS REFLEX CAMERAS

BACKGROUND OF THE INVENTION

1. Field of the Invention

The present invention relates to a device for adjusting the dioptry of a viewfinder eyepiece of a single-lens reflex camera.

2. Description of the Prior Art

The viewfinder eyepiece of single-lens reflex cameras is generally standardized to form images at about −1 diopeter (one meter ahead of the eye). It is often difficult for near-sighted, far-sighted or presbyopic persons to observe with their naked eye an image formed one meter in front of the eye, the difficulty varying with the individual. This, in turn, makes it difficult for those persons to properly adjust the focusing of the objective lens of a single-lens reflex camera. The problem of dioptry may be avoided by using spectacles, but this requires holding the eye physically away from the eyepiece, whereby the visual field is eclipsed or is hard to observe. For optical instruments, therefore, there have been proposed dioptry adjusting devices for adjusting an image to be formed at an easy-to-see position in conformity to the power of accommodation or adjusting faculties of the eye of the individuals. One typical method is to move the eyepiece along the optical axis and this method has been employed in the viewfinders for cine cameras, binoculars, microscopes, or the like. As a rule, if an eye piece of focal length f is displaced by $\Delta d$ then the amount of diopter variation can be represented by $1000 \cdot \Delta d/f^2$ diopters. As is clear from this formula, the shorter is the focal length f of an eyepiece, the greater is the range of dioptry variations available with a slight amount $\Delta d$ of movement of the eyepiece. When the eyepiece is made movable for dioptry adjustment, a space is required for permitting movement in the optical device. From the above discussion, however, it is apparent that the dioptry adjustment by movement of the eyepiece is suitable for use in an optical device whose eyepiece has a relatively short focal length or an optical device which has sufficient room for movement of the eyepiece.

Within the viewfinder in a single-lens reflex camera, an image of an object formed by an objective lens and projected on a focusing plate is generally magnified by an eyepiece having a positive refracting power, so that the focal length of the eyepiece must be longer than the length of the optical path from the eyepiece to the focusing plate. However, a penta prism for reversing an image has to be provided between the focusing plate and the eyepiece in a conventional viewfinder of a single-lens reflex camera. The optical path length defined above is normally longer than 50 mm, in the case of a 35 mm single-lens reflex camera. Therefore, the focal length of the eyepiece is about 55 mm to 70 mm which is longer than the optical path length. On the other hand, in order to cover individual difference in diopter a sufficient latitude of approximately 2 diopter is needed. As is clear from the above analysis of the dioptry variations, an eyepiece having a focal length of 55 to 70 mm is required to be moved within the range of 6 to 10 mm in order to ensure a dioptry latitude of 2 diopters. However, in the case of a 35 mm single-lens reflex camera, the eyepiece must be provided in a limited space behind the penta prism, leaving no extra space for such a wide range of movement. In addition, the greater movement of the eyepiece, results in an undesirable, increasing rate of change in viewfinder magnification. For the above reasons, means for continuous dioptry adjustment has not been provided in the viewfinder of conventional 35 mm single-lens reflex cameras. The only available method for dioptry adjustment in the viewfinder of a 35 mm single-lens reflex camera is that of selectively mounting separate attachment lenses behind the eyepiece in accordance with the individual difference in dioptry. However, this method requires several kinds of attachment lenses suited to the individual dioptry differences to be provided for interchanging use. In addition, attachment lenses positioned behind the eyepiece section cause the field of view to be partially eclipsed or to become poorly visible.

The applicant of the present invention has proposed in Japanese Patent Application No. 53-34718 a dioptry adjustable eyepiece system characterized in that the eyepiece comprises a negative lens element movable along the optical axis and a stationary positive lens element located at the eye or rear side of the negative lens element and is designed to have a positive refractive power as a whole with the focal length of the eyepiece being comparatively long. In the same application, the refactive power $\phi 1$ of the movable negative lens is selected within the following range as a desirable embodiment mode;

$$-0,04 \leq \phi 1 \leq -0.01$$

or the negative lens is a positive meniscus lens on the object side. Proposed also in the same application are dioptry adjustable eyepieces, wherein the lens elements are correlated as below;

$$0 < 1/r_3 \leq 0.045$$

and $$0.9 \leq r4/r5 \leq 1.2$$

wherein r3 and r4 are the radii of curvature of the negative lens on the object side and the eye side, respectively, while r5 is the radius of curvature of the positive lens on the object side. Also proposed is a dioptry adjustable eyepiece having more than 50 mm of composite focal length and wherein the negative lens moves less than 5 mm for the desired adjustment.

The present invention is contemplated to provide an adjustment mechanism for such a dioptry adjustable eyepiece system to be used in a single-lens reflex camera.

In the conventional dioptry adjustment of an eyepiece, as the entire eyepiece lens system is moved back and forth along the optical lens, the lens system is held by a cylinder which is guided by a screw or a groove cam for axial movement by their relative rotation. With the present invention, however, only a lens element on the side of an object i.e., between another outer lens and a penta prism is moved. Therefore it is difficult to employ such a cylindrical construction. If the cylindrical construction is to be employed for the optical system of the present invention, at least two cylinders are required for the fixed lens and movable lens, and still another may be needed for the operation of the lens. In the case of such two cylinder structure, as the movable lens element is located interior to the stationary lens element, the eyepiece section must project considerably from the camera body, e.g. from the top cover due to the fact that the cylinder for the movable lens element should extend to the back surface of the camera to be accessible from the outside for adjustment with room for its movement being left, and that the cylinder for the fixed lens element should extend considerably rearwardly.

Furthermore, the central portion of the top of a single-lens reflex camera is shaped to follow the shape of the roof surface of the penta prism, and as a result, the eyepiece lenses are often formed nearly rectangular. With the construction wherein lenses are supported in cylinders for rotation, the lenses must be made circular, and are unsuitable for a single-lens reflex camera. In addition, the eyepiece is arranged in an extremely narrow space between the penta prism and the rear wall of the top cover, wherein it is difficult to provide a complex mechanism for lens movement.

SUMMARY OF THE INVENTION

It is a principal object of the present invention to provide an improved adjustable diopter eyepiece in a single-lens reflex camera view finder.

According to the present invention, supporting and guiding members for the movable lens element are provided in the eyepiece section, while the members for drive control and operation are provided at a location away from the eyepiece section and linked with the supporting member.

With the structure of the present invention, the portion where the positive and negative lenses of the eyepiece are arranged contains a minimum number of parts, and the operation and drive control sections are oriented side ways of the penta prism or away from it so that the arrangement of the mechanism is very rational with the negative lens being only translated, thus providing an efficient, superior adusting mechanism for the novel dioptry adjustable viewfinder eyepiece optical system for a single-lens reflex camera.

The above and further objects and novel features of the invention will more fully appear from the following detailed description when the same is read in connection with the accompanying drawings. It is to be expressly understood, however, that the drawings are for purpose of illustration only and are is not intended as a definition of the limits of the invention.

DETAILED DESCRIPTION OF THE EMBODIMENTS

Figure 2:
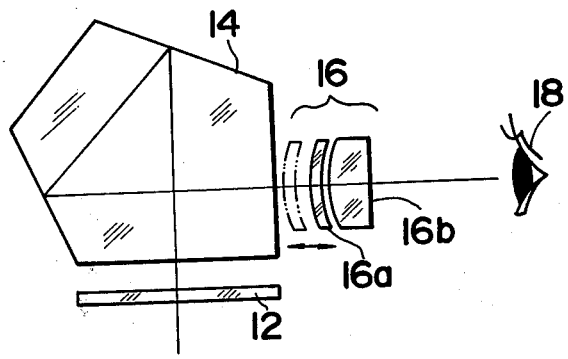
FIG. 2 is an explanatory diagram showing one example of the viewfinder optical system according to the present invention.

With reference to FIG. 2, which shows the viewfinder optical system of a single-lens reflex camera to which the present invention is applied, light from an object passing through an objective lens (not shown) and reflected by a movable mirror is focused on focusing plate 12, and transmitted through penta prism 14 and eyepiece 16 to the eye 18 of a photographer. The eyepiece comprises a movable negative lens 16a on the object side and a fixed or stationary positive lens 16b on the eye side and has a positive refractive power as a whole, while negative lens 16a is constructed such that is moves 2 to 3 mm to vary the dioptry from 2.9 to 2.3 diopters.

Figure 1:
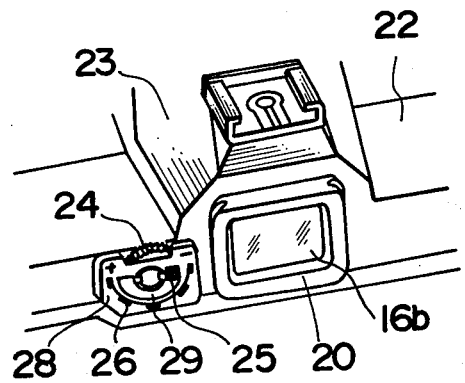
FIG. 1 is a perspective view showing the essential parts of one embodiment of the present invention.

FIG. 1 schematically shows the viewfinder eyepiece section according to the first embodiment of the present invention. Referring to FIG. 1, positive lens 16b of the eyepiece lens system is provided inside an eyepiece frame 20. A manually operable member 24 for dioptry adjustment and a scale plate 28 with scale marks 26 for indicating the amount of dioptry adjustment are provided sideways of eyepiece frame 20 on the rear of top cover 22 of a camera body, with the scale plate covering a considerable part of manual member 24. Manual member 24 is knurled at its circumference and is integrally provided with an index member 25 which is visible through a window 29 in scale plate 28. Penta prism cover 23 is shown fragmented in FIG. 1.

Figure 3:
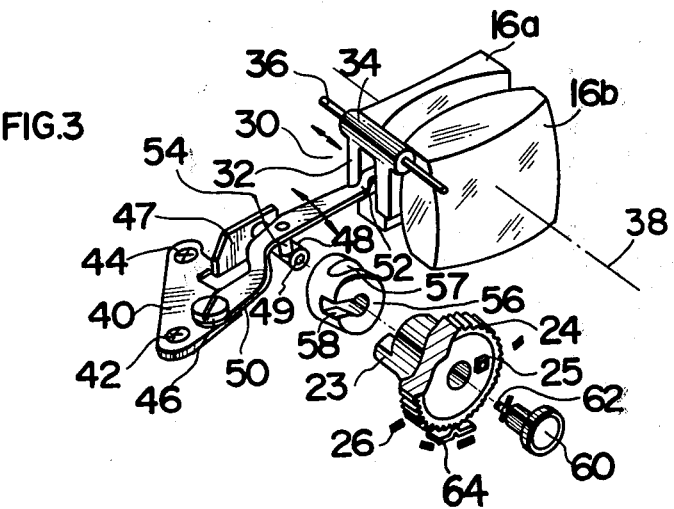
FIG. 3 is an exploded perspective view of the essential parts of the embodiment of the present invention shown in FIGS. 1 and 2.

With reference to FIG. 3, which is a perspective view of the essential parts of the first embodiment, a driven member 30 has a fork portion 32 and a small tubular cylindrical portion 34 and is fixed to negative lens 16a. A rod or shaft 36 passes through the axial bore in cylindrical portion 34 for the guide and support therefore, with supporting shaft 36 being arranged in parallel with the viewfinder optical axis 38 so that negative lens 16a may be translated along the optical axis. Fork section 32 is engaged by the free end 52 of a lever 50 which in turn is rotatably supported by pin 46 on a base plate 40 which is fixed by screws 42 and 44 to the camera body. A follower pin 54 is carried by lever 50. Shaft 48 formed with a screw hole at its tip is carried by vertically extending bent portion 47 of base plate 40, and is loosely fitted in or engages a cam member 56 which is formed with a cam groove 57 and cutout 58. Manual member 24 has a projection 23 engaging cutout 58 of cam member 56. Set-screw 60 passes through the bore of manual member 24 and is screwed or inserted with its threaded portion 62 into a tapped or screw hole 49 in shaft 48 for corotatably coupling manual member 24 with cam member 56. Pin 54 of lever 50 is engaged with cam groove 57 of cam member 56 before lever 50 is mounted on base plate 40. A click spring 64 has a bent or projecting portion resiliently engaging the knurling of operating member 24.

In operation, when manual member 24 is rotated changing the position of index 25 relative to scale marks 26, cam member 56 is also rotated integrally therewith, thereby rotating lever 50 by way of pin 54, whereby negative lens 16a is moved back and forth along the optical axis for dioptry adjustment. It is to be noted that driven member 34 may be omitted by forming the negative lens 16a with a portion engageable with the lever 50 and a portion coupled with the guide rod 36. It will be apparent to those skilled in the art that various modifications are available for the translational guide of the negative lens and for the engagement of the lever with the lens or the driven member.

Figure 4A:
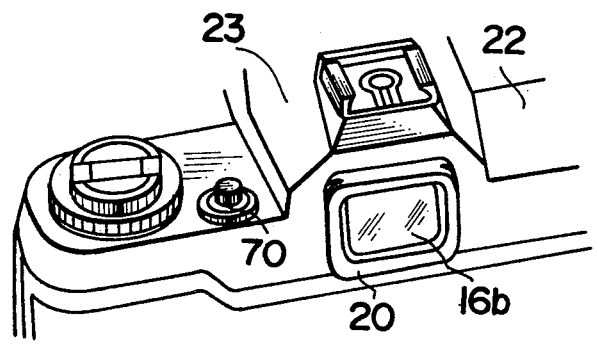
FIG. 4(a) is a perspective view schematically showing the essential parts of another embodiment of the present invention.
Figure 4B:
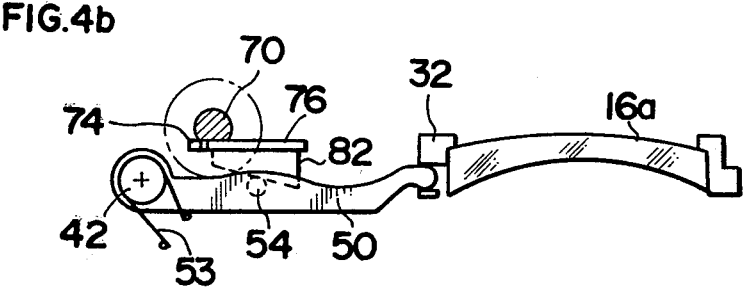
FIGS. 4(b) and 4(c) are fragmentary flow and front elevational views respectively of the embodiment of FIG. 4(a), FIGS. 5(a) and 5(b) are fragmentary perspective views schematically showing the essential parts respectively of the third and fourth embodiments of the present invention.
Figure 4C:
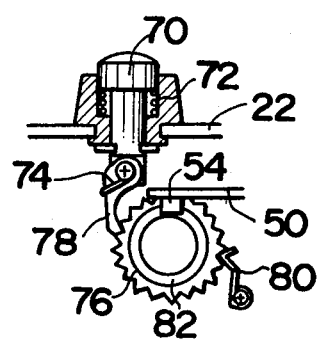

FIGS. 4(a), (b) and (c) show another embodiment of the present invention, and the same reference numbers are used for members identical in function to or members substantially corresponding to those of FIGS. 1 and 3, and the explanation thereof is omitted for simplification. A depressably operating button 70 is biased upwards by a coil spring 72 and is provided with a depending shaft and a pawl or claw member 78 is pivoted on the button shaft and biased by a spring 74 counterclockwise to engage a ratchet gear 76 at all times. Each depression of operating button 70 advances and rotates ratchet gear 76 by one tooth. When the operating button is returned, claw member 78 slides over a tooth of ratchet gear 76 and engages a trailing tooth. At this time, ratchet gear 76 is restrained in place by click spring 80. Ratchet gear 76 is integrally provided with a solid or end cam 82, against which pin 54 of lever 50 bears under the influence of a spring 53. Therefore, lever 50 is rotated by an angle commensurate with the number of depressions of operating button 70, whereby negative lens 16a is moved along the optical axis for a desired amount.

Figure 5A:
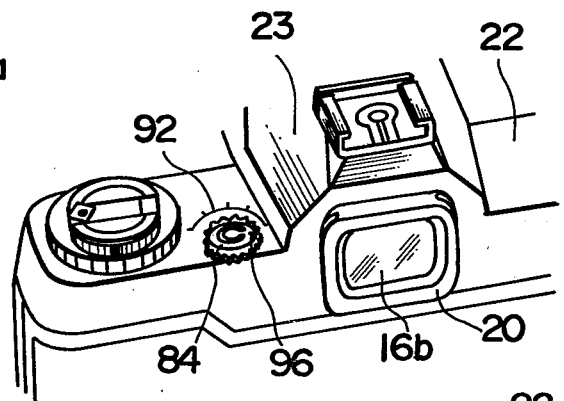
FIG. 5(c) is a plan view of an internal construction common in principle to the both embodiments of FIGS. 5(a) and 5(b).
Figure 5B:
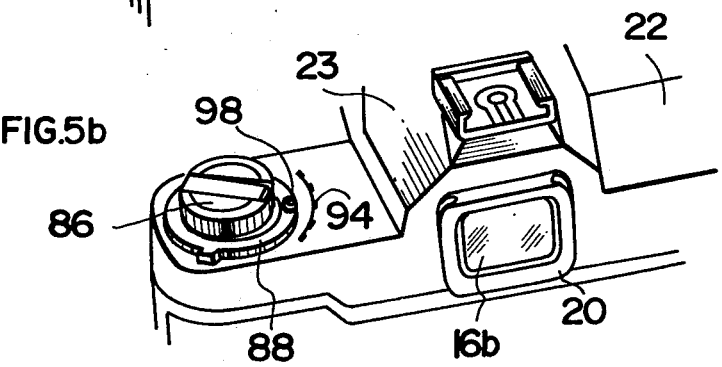
Figure 5C:
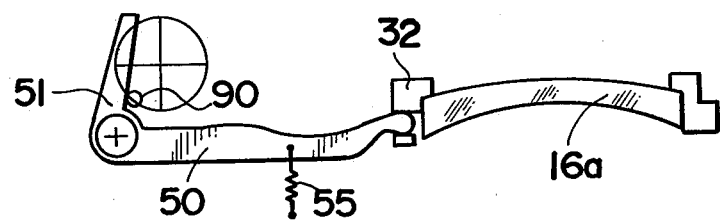

FIG. 5 shows other embodiments of the present invention, wherein the same reference numbers are used for members common to or identical in function to the above embodiment, and the explanation thereof is omitted. In these embodiments, lever 50 is angular and includes a second arm 51 and is biased clockwise by a spring 55, and second arm 51 abuts against pin 90 which moves circumferentially in response to the rotation of a manually adjustable operating disk 84 or operating ring 88. The dis 84 is provided independently and rotatably on the top surface of camera to cover 22, while the ring 88 is provided coaxially with rewinding knob 86. When operating disk 84 or ring 88 is rotated to change the position of respective index 96 or 98 relative to a respective scale mark 92 or 94, lever 55 is rotated thereby to translate negative lens element 16a axially.

Having described our invention as related to the embodiments shown in the accompanying drawings, it is our intension that the invention be not limited by any of the details of description, unless otherwise specified, but rather be constructed broadly within its spirit and scope as set out in the accompanying claims.

We claim:

1. A view-finder system for a single lens reflex camera comprising:
   an eyepiece lens system having a positive power as a whole and including a negative lens element movable in the view finder along the optical axis thereof and a positive lens element located stationary at the eye side of said negative lens element;
   guide means for guiding said negative lens element for translational movement thereof along said optical axis;
   a lever having an arm engageable with said negative lens element to determine the axial position of the lens as a function of angular position of the lever;
   a manual member; and
   control means for controlling the angular position of said lever in accordance with the operation of said manual member, said control means including a cam member engageable with said lever, a ratchet gear, a resilient member for resiliently restraining the rotational position of said ratchet gear, and a claw member engaging with said ratchet gear and responsive to the operation of said manual member for advancing said ratchet wheel, said ratchet gear being interlocked with said cam member.

2. In a single lens reflex camera including a pentaprism having a rear exit face, an adjustable viewfinder comprising an eyepiece of positive power disposed rearwardly of and directed toward said pentaprism rear face and including a stationary positive rear lens and an axially movable front negative lens disposed between said rear lens and said pentaprism rear face, an externally accessible, movable, manual adjusting member located on said camera transversely offset from said eyepiece and having a rotatably mounted knob, guide means supporting said front negative lens for movement along the optical axis of said eyepiece and motion transmission means having an input drive coupled to said adjusting member, and including a transversely extending lever swingably mounted at a point transversely spaced from said eyepiece and having an outer end portion coupled to said front negative lens, and motion translating means coupling said adjusting member to said lever, and including a cam rotatable with said adjusting member knob and a follower mounted on said lever and engaging said cam, and an output drive coupled to said front negative lens for axially shifting said front negative lens in response to the movement of said adjusting member.

3. A view-finder system for a single lens reflex camera as in claim 1 wherein said lever is swingable about an axis perpendicular to said laterally extending lever and to said optical axis.

4. In a single-lens reflex camera including a pentaprism having a rear exit face, an adjustable viewfinder comprising an eyepiece of positive power disposed rearwardly of and directed toward said pentaprism rear face and including a stationary positive rear lends and an axially movable front negative lens disposed between said rear lens and said pentaprism rear face, an externally accessible, movable, manual adjusting member located on said camera transversely offset from said eyepiece and having a rotatably mounted knob, guide means supporting said front negative lens from movement along the optical axis of said eyepiece and motion transmission means having an input drive coupled to said adjusting member, and including a transversely extending lever swingably mounted at a point transversely spaced from said eyepiece and having an outer end portion coupled to said front negative lens and motion translating means coupling said adjusting member to said lever, and including a pin depending eccentrically from said adjusting member knob and spring means biassing said lever into following engagement with said pin, and an output drive coupled to said frong negative lens for axially shifting said front negative lens member in response to the movement of said adjusting member.

5. In a single-lens reflex camera including a pentaprism having a rear exit face, an adjustable viewfinder comprising an eyepiece of positive power disposed rearwardly of and directed towards said pentaprism rear face and including a stationary positive rear lens and an axially movable front negative lens disposed between said rear lens and said pentaprism rear face, an externally accessible, movable, manual adjustment member located on said camera transversely offset from said eyepiece, and including a depressible button spring biassed to a raised position, guide means supporting said front negative lens for movement along the optical axis of said eyepiece and motion transmission means having an input drive coupled to said adjusting member and including a transversely extending lever swingably mounted at a point transversely spaced from said eyepiece and having an outer end portion coupled to said front negative lens and motion translating means coupling said adjusting member to said lever and including a coaxial concurrently rotatable cam and ratchet wheel, a follower mounted on said lever and engaging said cam and a pawl movable with said button and engaging said ratchet wheel, and an output drive coupled to said front negative lens for axially shifting said front negative lens in response to the movement of said adjusting member.

* * * * *